(12) United States Patent
Hill (10) Patent No.: US 6,206,526 B1
(45) Date of Patent: Mar. 27, 2001

(54) BI-FOCAL PLANE REAR VIEW MIRROR

(76) Inventor: Gary D. Hill, 15837 W.3rd Ave., Golden, CO (US) 80401

( * ) Notice: Subject to any disclaimer, the term of this patent is extended or adjusted under 35 U.S.C. 154(b) by 0 days.

(21) Appl. No.: 09/436,534

(22) Filed: Nov. 9, 1999

Related U.S. Application Data

(60) Provisional application No. 60/109,583, filed on Nov. 23, 1998.

(51) Int. Cl.[7] ............................. G02B 5/08; G02B 7/182
(52) U.S. Cl. ........................................... 359/850; 359/865
(58) Field of Search ..................................... 359/850, 864, 359/865, 866; 248/467, 477, 478

(56) References Cited

U.S. PATENT DOCUMENTS

| | | | |
|---|---|---|---|
| 3,881,811 | * | 5/1975 | French ................................. 359/864 |
| 4,293,191 | * | 10/1981 | Kim . | |
| 5,044,739 | * | 9/1991 | Do Espirito Santo ............... 359/864 |
| 5,691,855 | * | 11/1997 | Lupkas ................................. 359/866 |

* cited by examiner

Primary Examiner—Cassandra Spyrou
Assistant Examiner—Mark A. Robinson
(74) Attorney, Agent, or Firm—Scott L. Terrell, P.C.

(57) ABSTRACT

In a rearview mirror assembly having a primary mirror housing, adapted to be supported on a vehicle, and a primary mirror movably supported in the mirror housing, the invention provides an improvement comprising a dependent mirror having a reflective face, and a back portion, a backing plate, having a horizontal and a vertical axis, rigidly connected to the back portion, and including a channel extending the length of the vertical axis and centrally located along the horizontal axis, an axle having a first and a second end movably supported in the channel wherein at least a portion of each end projects outwardly from the backing plate, a means for housing the dependent mirror, and a means for fastening the dependent housing means to the primary mirror.

12 Claims, 7 Drawing Sheets

BI-FOCAL PLANE REAR VIEW MIRROR

CROSS REFERENCE TO RELATED APPLICATIONS

Pursuant to 35 U.S.C. 119 (e)(1), Applicants claims the benefit of U.S. Provisional Application No. 60/109,583, filed Nov. 23, 1998 pursuant to 35 U.S.C. 111(b), and entitled: A Bi-focal Plane Rear View Mirror.

BACKGROUND OF THE INVENTION

1. Field of the Invention

This invention relates to rear view mirrors. In particular, it relates to rear view mirrors having two focal planes and is useful to provide the operator of a motorized, or self propelled vehicle a panoramic view having little or no distortion.

2. Description of the Prior Art

Various types of automotive vehicles and self propelled vehicles are provided with externally mounted rear view mirrors to enable the operator to have a relatively wide angle of view to the rear of the vehicle. Particularly, in the case of large vehicles, such as a recreational vehicle, the driver often encounters a blind spot when turning or backing up such that an adequate rear viewing cannot be accomplished. Consequently, various mirror systems have been developed that will accomplish an automatic mirror movement, including U.S. Pat. No. 5,052,792. However, such mirrors are costly to manufacture and complicated in assembly.

There are other manually operated mirrors systems which are less expensive to manufacture and more versatile in application. For example, in U.S. Pat. No. 4,345,819 a multi-angular panoramic automotive rear view mirror is disclosed. There, a centrally located multiple angle combination has two integral flat mirrors having faces which are inter-connected by a pivot arm extending between the mirrors. This design contemplates an interior rear view mirror adhered to the inside of a windshield. Because the mirror is centrally located, it further includes a arrow indicia on each mirror to eliminate operator confusion as to the directional view of each respective mirror.

There are several problems with the foregoing mirror assembly which are desirably overcome. This assembly is not feasible for use outside of a vehicle because it comprises two separate mirrors which are attached at the respective mirror housings, by an arm. A pivot is provided at the end, of at least one arm, for pivotal connection between the mirrors. In this manner, at least one of the mirrors would likely be unstable at speed, and subject to physical forces, resulting in frequent adjustments of the view plane for each mirror. In addition, this two mirror assembly must be manufactured as a unit. That is, if the vehicle comes with a single rear view mirror, at each desired location, each existing mirror must be replaced with the assembly.

In view of the foregoing considerations, there is an apparent need for a multi-plane mirror assembly, which is simple to operate but which is stable enough to maintain the desired relative angles of deviation for exterior use on a motorized, or self propelled, vehicle. Moreover, there is a need to provide a low cost mirror assembly which is easily adapted in modification of an existing single mirror.

SUMMARY OF THE INVENTION

Accordingly, it is an object of this invention to provide a multi-plane mirror assembly, which is simple to operate but which is stable enough to maintain the desired relative angles of deviation for exterior use on a motorized or self propelled vehicle.

Another object of the present invention is to provide a low cost mirror assembly which is easily adapted in modification of an existing single mirror.

These and other objects of the present invention will become apparent throughout the description of the invention which now follows.

Briefly, the invention provides, in a rearview mirror assembly having a primary mirror housing, adapted to be supported on a vehicle, and a primary mirror movably supported in the mirror housing, the improvement comprising a dependent mirror having a reflective face, and a back portion, a backing plate, having a horizontal and a vertical axis, rigidly connected to the back portion, and including a channel extending the length of the vertical axis and centrally located along the horizontal axis, an axle having a first and a second end movably supported in the channel wherein at least a portion of each end projects outwardly from the backing plate, a means for housing the dependent mirror, and a means for fastening the dependent housing means to the primary mirror.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENT

The rearview mirror assembly provides a primary mirror and a dependent mirror, adjustably interconnected in a simultaneously, or independently, movable relationship relative to the plane of each mirror. In this manner, in combination, the primary and dependent mirrors provide an adjustable rearward reflection in at least two planes. The mirror assembly provides a low cost assembly suitable in the modification of an existing single mirror, or the manufacture of the assembly, as unit, for self propelled or motorized vehicles.

The invention includes a mirror housing adapted to be supported on a vehicle, and a primary mirror movably supported in the mirror housing. The dependent mirror has a reflective face, and a back portion. A backing plate, is provided having a horizontal and a vertical axis, and is rigidly connected to the back portion of the dependent mirror. The backing plate includes a channel extending the length of the vertical axis and which is centrally located along the horizontal axis. A pivot axle having, a first and a second end, is movably supported in the channel with at least a portion of each end projecting outwardly from the backing plate. A dependent mirror housing, provides for pivotal support of the dependent mirror. The dependent mirror housing has a back and side walls. The side walls have a means for pivotally connecting the first and second ends of the pivot axle to the housing. In this manner, the mirror and backing plate are received within the dependent housing. A friction lock is disposed about the circumference of at least one end of the pivot axle for biasing against the housing and the backing plate. The dependent mirror housing is fastened to the reflective face of the primary mirror.

Figure 1:
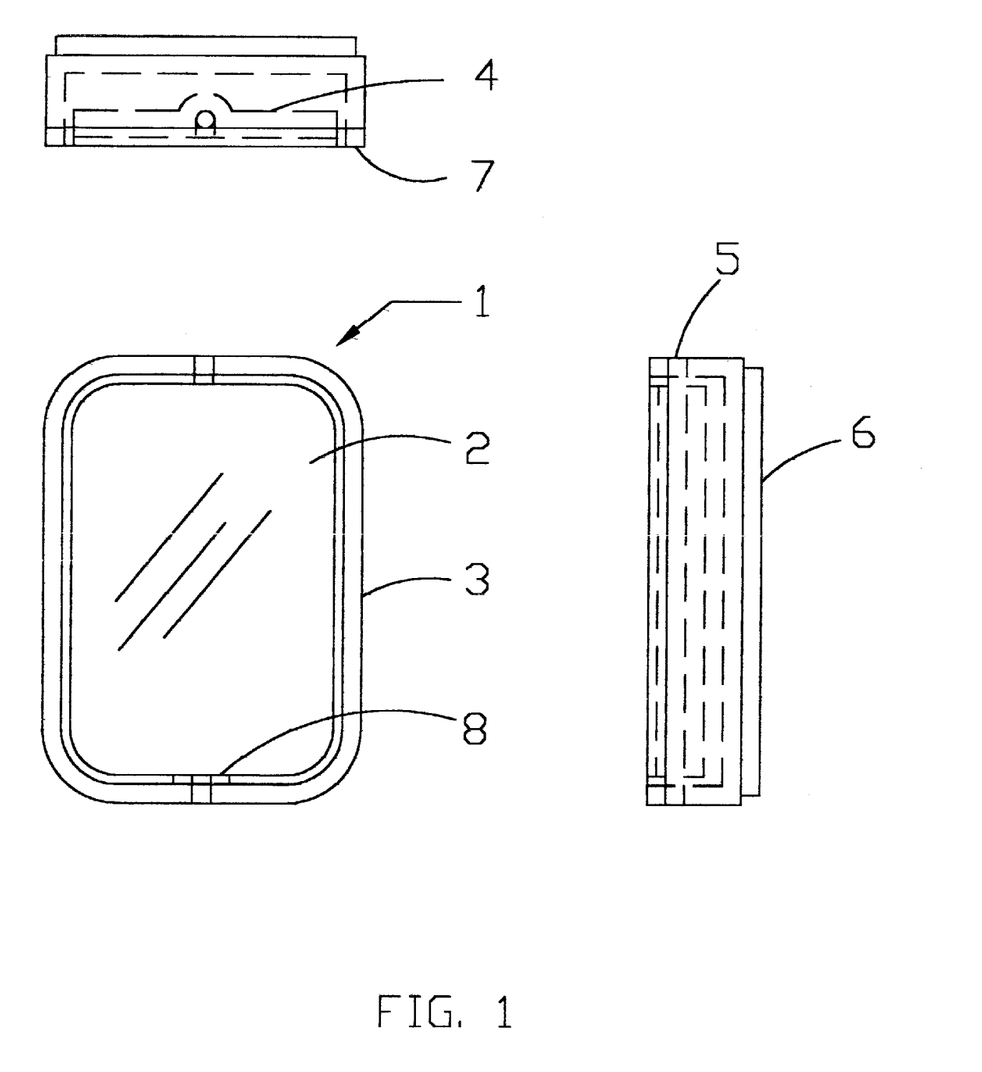
FIG. 1 is a top, front, and side view of a preferred embodiment of the invention.
Figure 2:
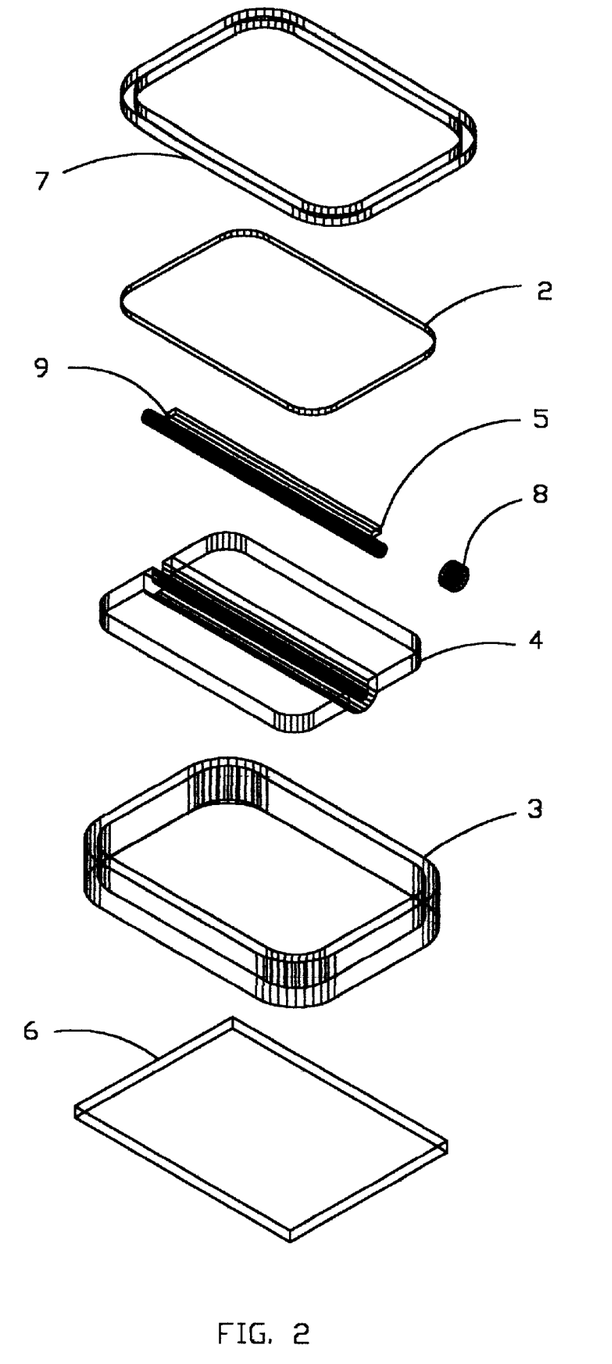
FIG. 2 is a three dimensional exploded view of the embodiment of FIG. 1.

With reference now to the drawing FIGS. 1 and 2, it is generally shown the elements of the multi-plane mirror assembly 1 according to the present invention. Mirror assembly 1 is useful for fastening to the face of an existing mirror (not shown), such as the outside side rear view mirror of a motor vehicle. Dependent mirror 2 of the assembly 1 has a reflective face, and a back portion. Backing plate 4, has a horizontal and a vertical axis, and is rigidly connected to the back portion of mirror 2. A channel or groove extends the length of the vertical axis and is centrally located along the horizontal axis of the backing plate 4. Pivot axle 5, preferably at least one-eight of an inch in diameter, has a first and a second end and is movably supported, between the axle ends, in the channel. At least a portion of each axle end projects outwardly from the backing plate 4. As shown, the axle 5 is held in movable connection by a retaining insert 9 fitted between mirror 2 and the axle 5. In this embodiment, dependent mirror housing 3 has a back and side walls. The side walls have a means for pivotally connecting, such as a clip, bracket, bushing, or insert, the first and second ends of axle 5 to the housing 3 (not shown in FIG. 2). Connection of the axle 5 ends to the housing 3 provides for pivotal attachment of the mirror 2 and backing plate 4 to the housing. A friction lock 8 may be disposed about the circumference of at least one end of axle 5. Lock 8 resiliently biases against the housing 3 and the backing plate 4 for securing the desired setting of the dependent mirror's 2 pivotal deviation adjustment, within the housing 3, as against physical force. A housing frame 7 may be adhered to the frontal surface of housing 3. The frame 7, is useful to provide a finished appearance (shown) or may be the primary mirror when assembly 1 is configured as set forth in the embodiment(s) described below. Mirror housing 3 is easily fastened to the reflective face of an existing primary mirror by an adhesive 6, preferably an adhesive backing or tape. Once the dependent mirror assembly 1 is fastened to a primary mirror it is appreciated that the operator then has the option of moving either mirror, independently of the other, in order to achieve a panoramic view.

Figure 3:
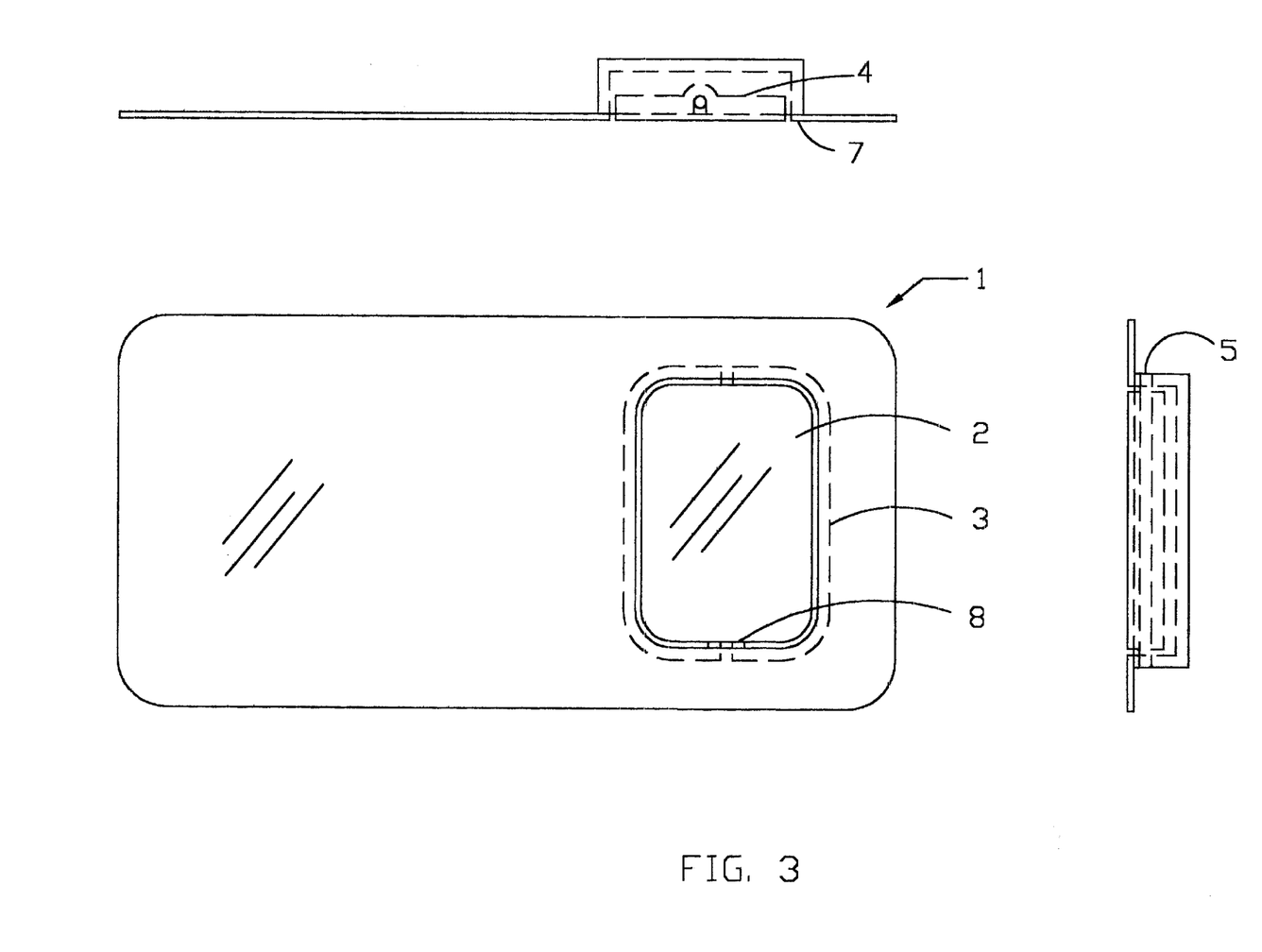
FIG. 3 is a top, front, and side view of another embodiment of the invention.
Figure 4:
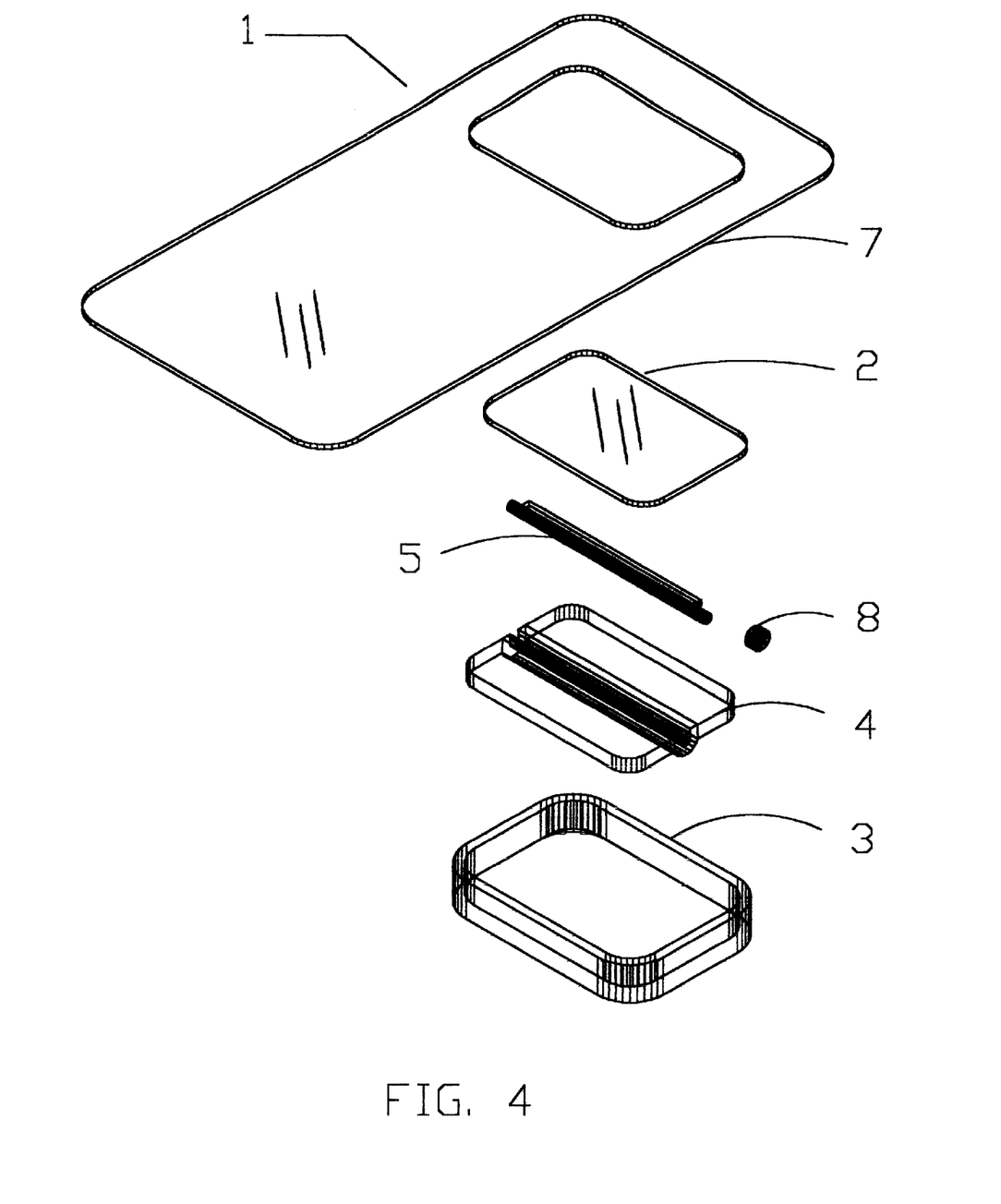
FIG. 4 is a three dimensional exploded view of the FIG. 3 embodiment.

In FIGS. 3 and 4, it is generally shown another embodiment of the invention 1 which is particularly suited in the manufacture of an entire dependent and primary mirror assembly, or in the mechanical modification of an existing primary mirror. Here, frame 7, of FIGS. 1 and 2, is a primary mirror constructed such that it includes a recessed, or a cut-out, portion in the reflective face, for securing the dependent mirror housing 3. In this manner, it is appreciated that the frontal face of housing 3, can either be inserted through the cut-out, or secured to the non-reflective (backside) face of the primary mirror frame 7.

Figure 5:
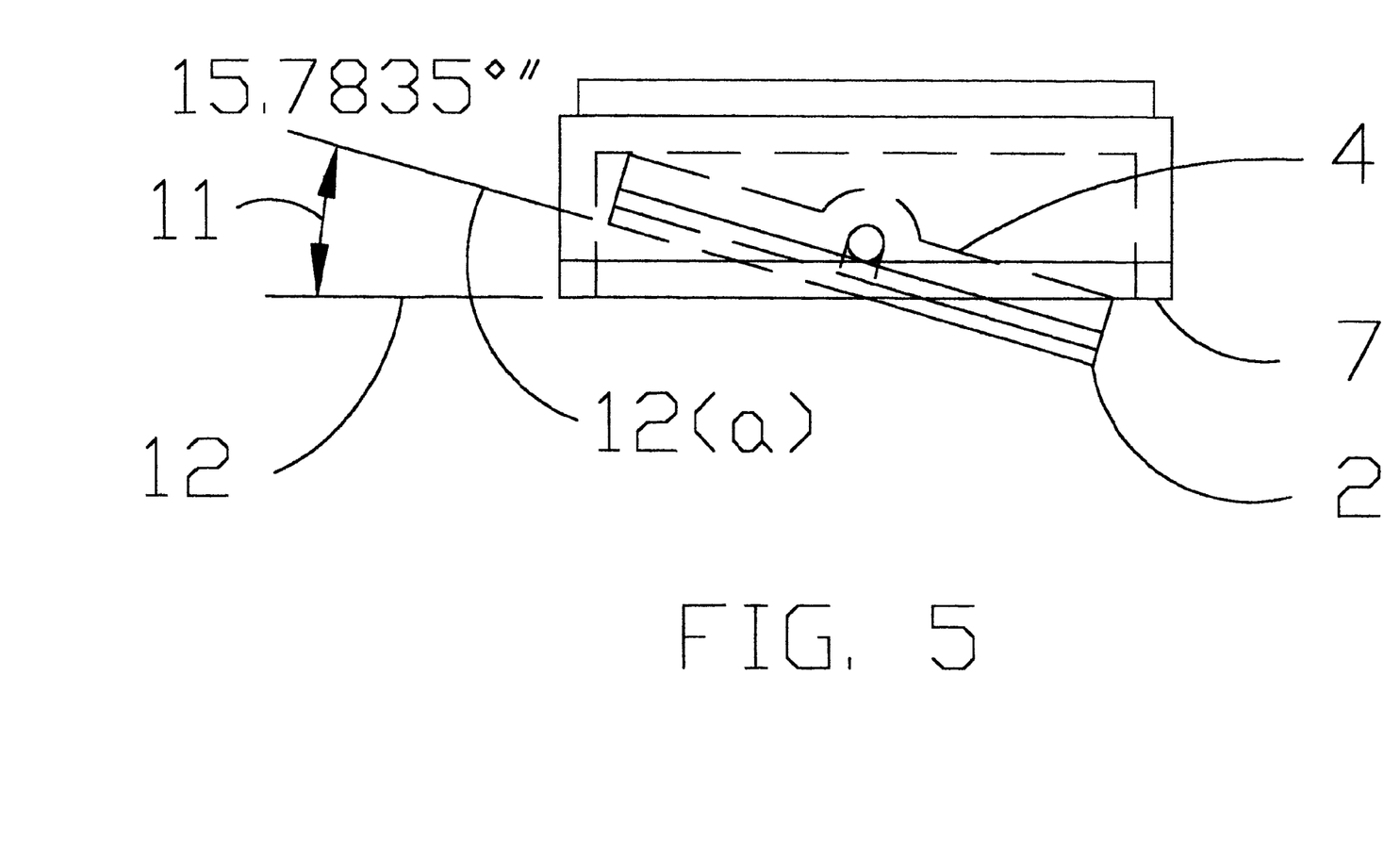
FIG. 5 is a top view of showing the deviation of the dependent mirror.

Referring now to FIG. 5, a top view of the assembly demonstrates the desired maximum angular pivotal deviation 11 of dependent mirror 2 plane 12(a) in relation to the primary mirror or frame 7 plane 12. The preferred maximum angular deviation 11 is less than sixteen degrees.

Figure 6:
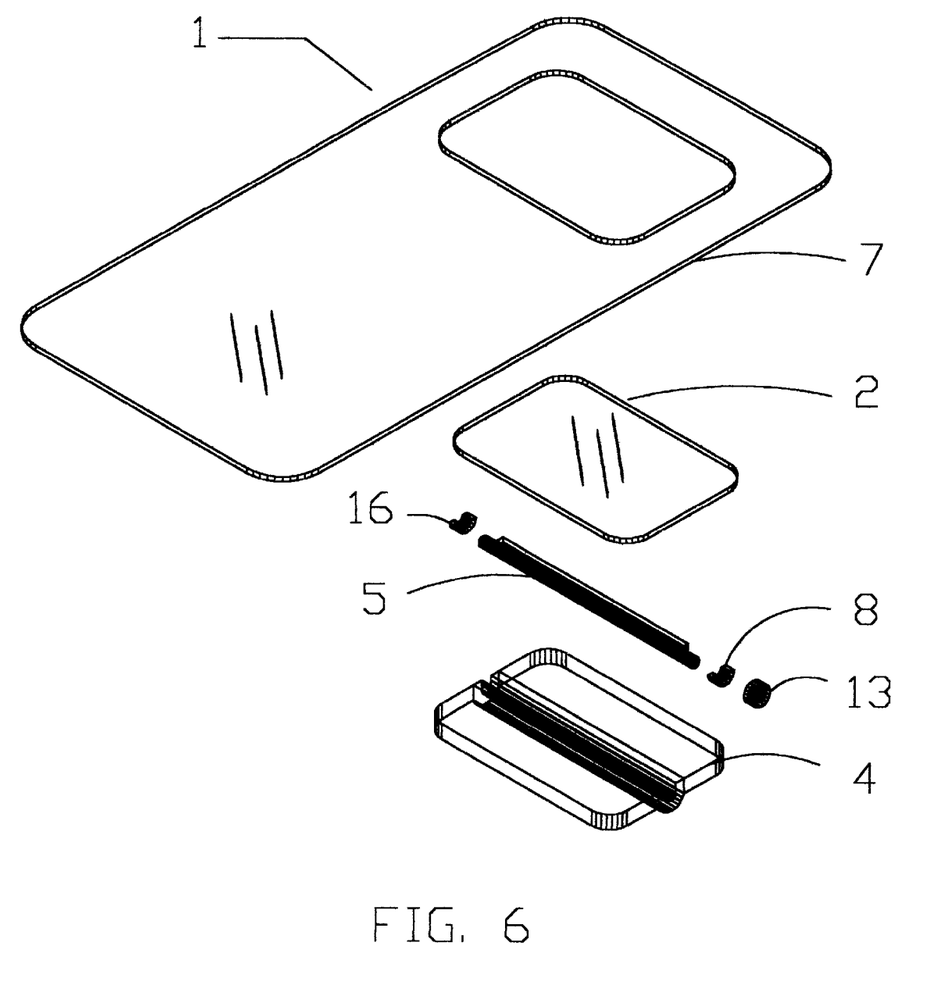
FIG. 6 is an exploded view of a further embodiment of the invention.
Figure 7:
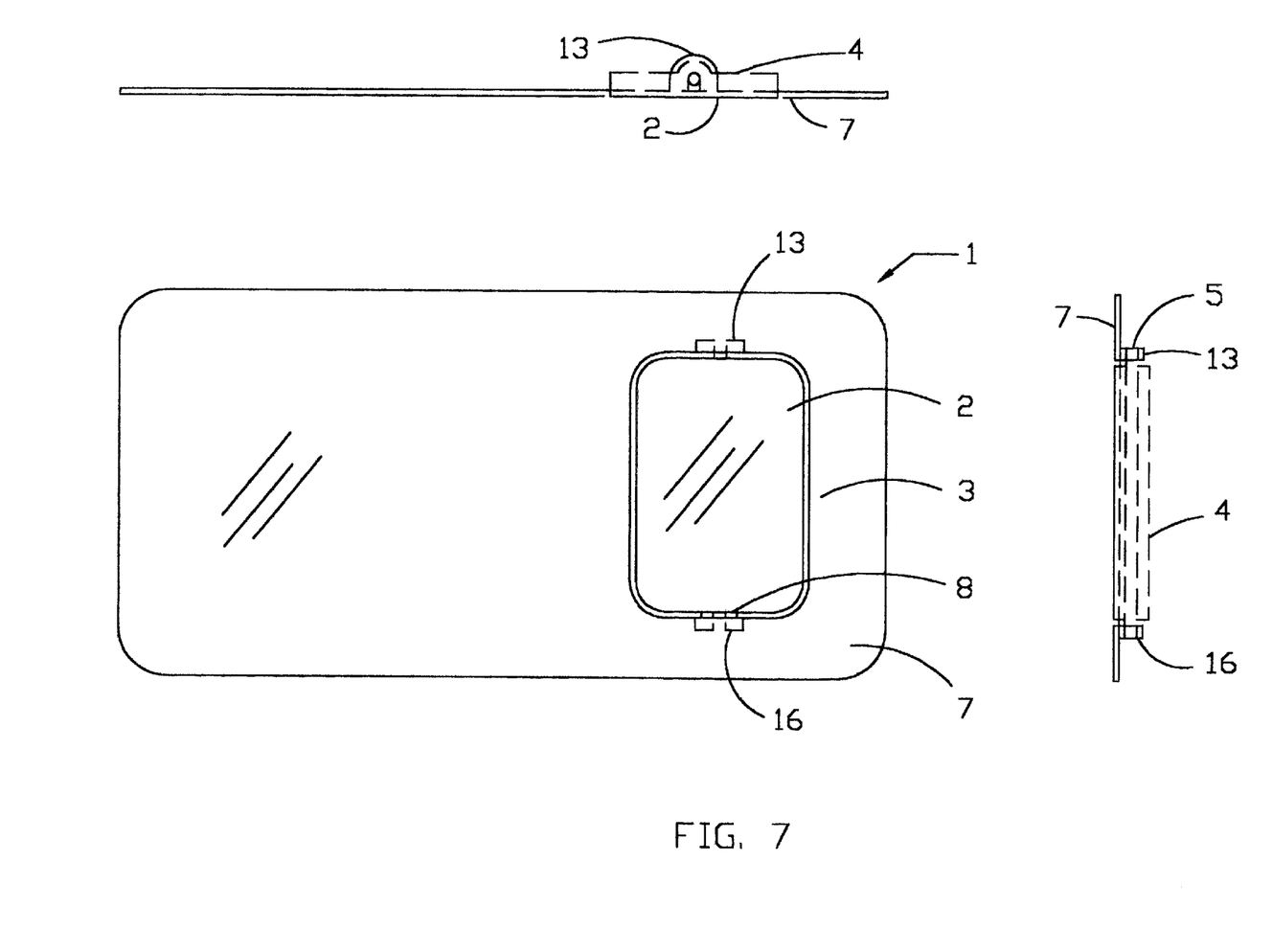
FIG. 7. Is a top, front, and side view of the embodiment of FIG. 6.

In FIGS. 6 and 7, another embodiment of the invention is shown wherein the housing 3, of the foregoing figures, is comprised of brackets 13 and 16. These brackets are rigidly connected to an upper and lower peripheral edge of a cut-out portion in the primary mirror frame 7. The interior center faces of brackets 13 and 16 serve as the means for pivotally receiving axle 5 ends. When connected, brackets 13 and 16 thereby provide for pivotal contact of the backing plate 4 and dependent mirror 2 assembly to primary mirror frame 7.

While the present invention has been illustrated and described with reference to particular structures and methods of fabrication, it will be apparent that other changes and modifications can be made therein within the scope of the present invention as defined by the appended claims.

I claim:

1. In a rearview mirror assembly having a primary mirror housing, adapted to be supported on a vehicle, and a primary mirror having a reflective face movably supported in the mirror housing, the improvement comprising:
   (a) a dependent mirror having a reflective face, a back portion, and a horizontal and vertical axis,
   (b) a channel backing enclosing a channel between the channel backing and the back portion, the channel extending the length of the vertical axis and centrally located along the horizontal axis,
   (c) an axle having a first and a second end the axle received in the channel wherein at least a portion of each end projects outwardly from the channel,
   (d) a means for housing the dependent mirrors, the dependent housing receiving the first and second axle ends for pivotal engagement of the dependent mirror in relation to the dependent housing, and
   (e) a means for fastening the dependent housing means to the primary mirror.

2. The mirror assembly of claim 1 wherein the dependent housing means includes a back and side walls wherein the side walls receive the first and second ends of the axle, and the backwall is fastened to the primary mirror reflective face.

3. The mirror assembly of claim 1 wherein the dependent housing means includes side walls, the sidewalls having a means for receiving the first and second ends of the axle, and the primary mirror includes a recess, or a cut-out, portion for receiving the sidewalls.

4. The mirror assembly of claim 1 wherein the dependent housing means is a recess or a cut-out portion in the primary mirror.

5. The mirror assembly of claim 4 wherein the dependent housing means further includes a bracket connected to an upper and lower peripheral edge of the recess or cut-out portion in the primary mirror.

6. The mirror assembly of claim 1 wherein the primary mirror and dependent mirrors are planar and the plane of the dependent mirror has a maximum angular pivotal deviation of less than sixteen degrees in relation to the plane of the primary mirror.

7. The mirror assembly of claim 1 wherein the axle is at least one-eight of an inch in diameter.

8. The mirror assembly of claim 1 further comprising a friction lock, disposed about the circumference of at least one axle end for biasing against the dependent mirror housing and the backing.

9. The mirror assembly of claim 8 wherein the friction lock consists essentially of rubber.

10. The mirror assembly of claim 1 further comprising a frame circumscribing the dependent mirror reflective face.

11. The mirror assembly of claim 2 wherein the fastening means is an adhesive between the back wall and the primary mirror face.

12. The mirror assembly of claim 2,3, or 4, further comprising a clip for receiving each of the axle ends.

* * * * *